Jan. 18, 1944.  J. C. WHEAT ET AL  2,339,731
TRACTOR CRANE CONSTRUCTION
Filed July 29, 1941  3 Sheets-Sheet 1

Inventors.
James C. Wheat.
Carl U. North.
BY Frank C. Fearman
Attorney.

Jan. 18, 1944. J. C. WHEAT ET AL 2,339,731
TRACTOR CRANE CONSTRUCTION
Filed July 29, 1941 3 Sheets-Sheet 2

Inventors.
James C. Wheat.
Carl U. North.
BY Frank C. Fearman.
Attorney

Jan. 18, 1944.   J. C. WHEAT ET AL   2,339,731
TRACTOR CRANE CONSTRUCTION
Filed July 29, 1941   3 Sheets-Sheet 3

Inventors
James C. Wheat.
Carl U. North.
BY Frank C. Fearman
Attorney

Patented Jan. 18, 1944

2,339,731

UNITED STATES PATENT OFFICE 2,339,731

TRACTOR CRANE CONSTRUCTION

James C. Wheat and Carl U. North, Bay City, Mich., assignors to Industrial Brownhoist Corporation, Bay City, Mich., a corporation of Ohio Application July 29, 1941, Serial No. 404,542

6 Claims. (Cl. 280—106)

This invention relates to tractor cranes, excavating machines, and similar equipment, and more particularly to the car body frame construction thereof.

One of the prime objects of the invention is to design a car body frame, open at the bottom to facilitate installation of the operating mechanism; and provide covers forming a closure for said open bottom, so that the frame casting can be made comparatively light in weight and yet possess maximum strength for the purpose intended.

Another object of the invention is to design a lightweight main car frame casting having top, side, and end walls; and provide removable covers for the open bottom end to exclude dirt, dust, and other foreign matter from the driving mechanism, said cover members serving as diagonal compression struts to resist the torsional strains set up by the loads imposed on the car body during the normal operation of the machine.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions and minor details of construction, without departing from the spirit, or sacrificing any of the advantages of the invention.

Figure 1:
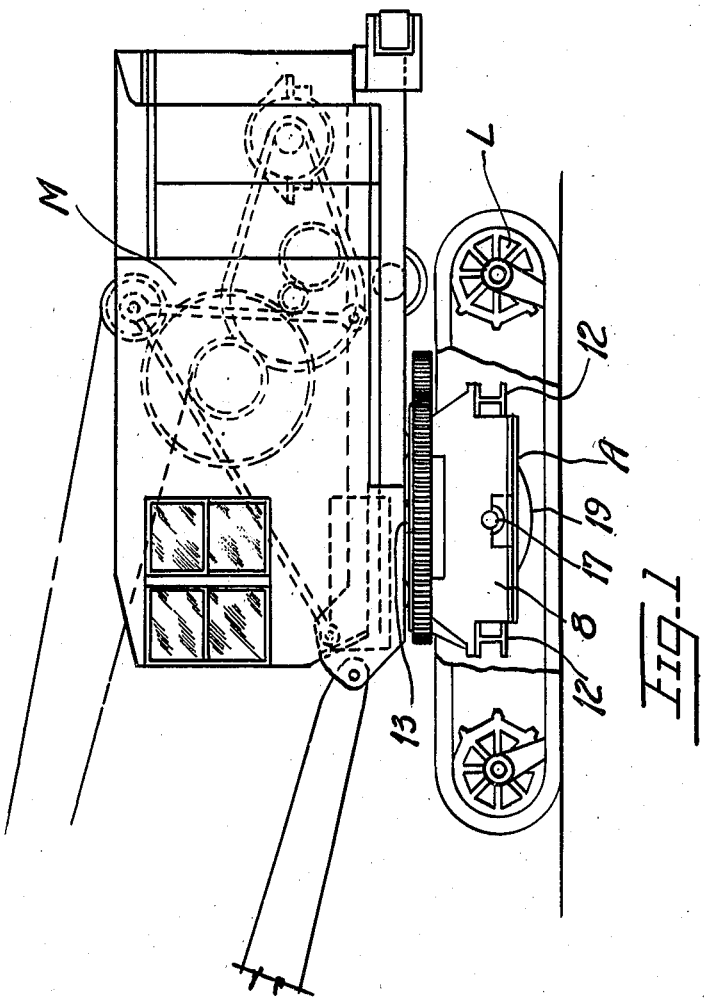
Fig. 1 is a fragmentary side elevational view of a creeping crawler.
Figure 2:
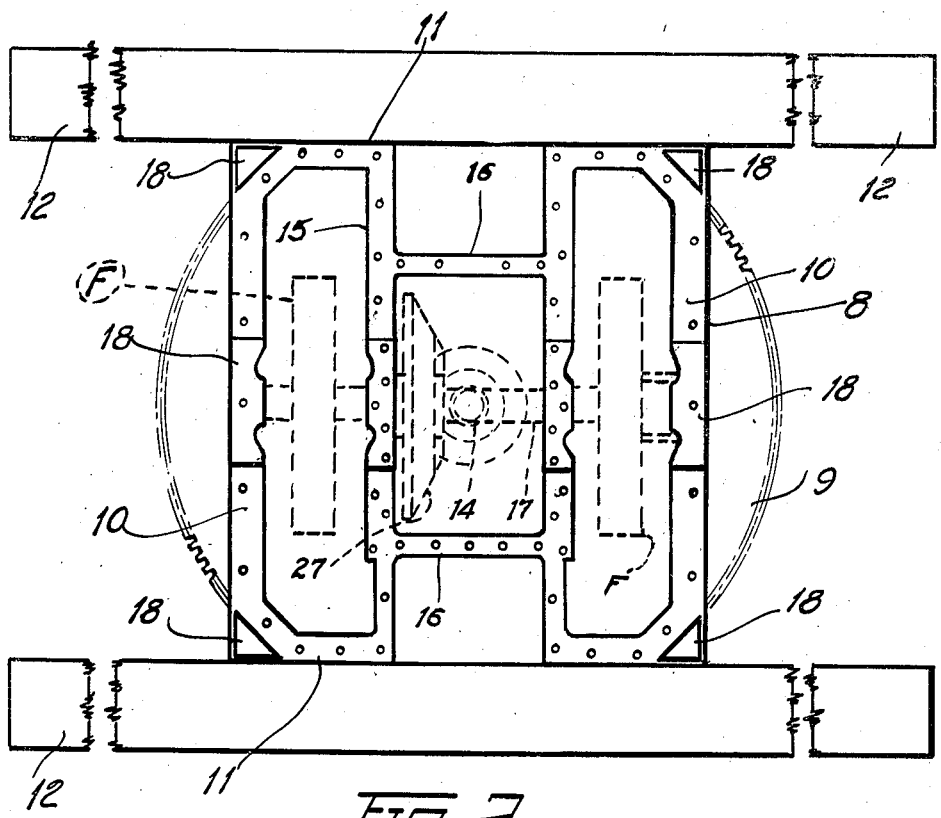
Fig. 2 is a detail inverted plan view illustrating the open end of the main car body casting.
Figure 7:
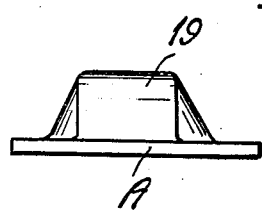
Fig. 7 is an inverted end elevational view of one of the side cover plates; and, Fig. 8 is an enlarged fragmentary sectional view taken on the line 8—8 of Fig. 3.
Figure 6:
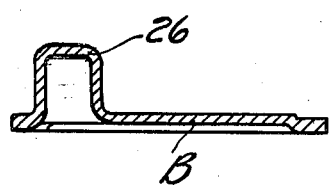
Fig. 6 is an inverted transverse sectional view taken on the line 6—6 of Fig. 3.
Figure 8:
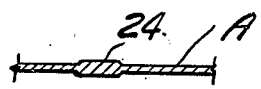
Figure 3:
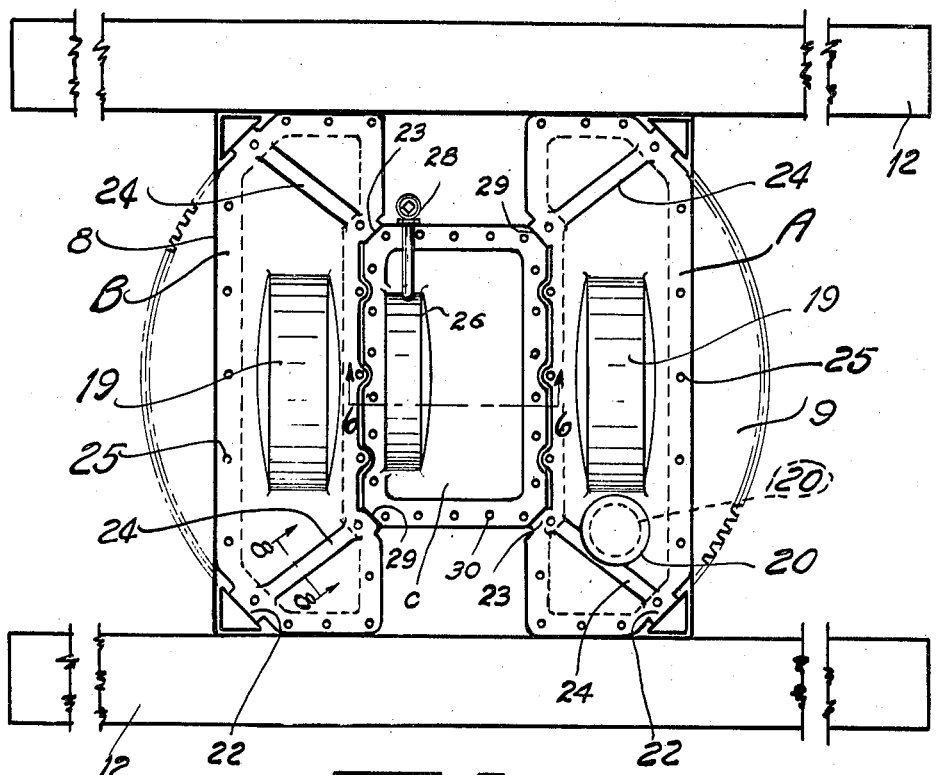
Fig. 3 is a view similar to Fig. 2 showing the covers secured in position.
Figure 4:
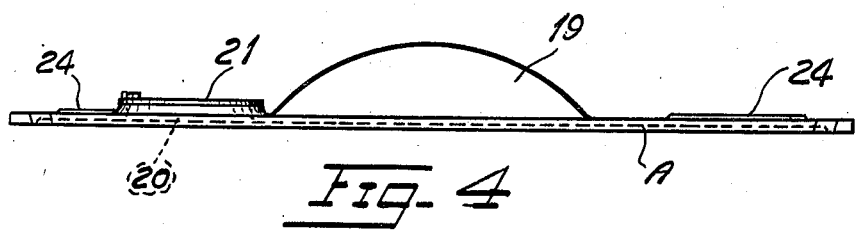
Fig. 4 is an enlarged inverted side elevational view of one of the cover members.
Figure 5:
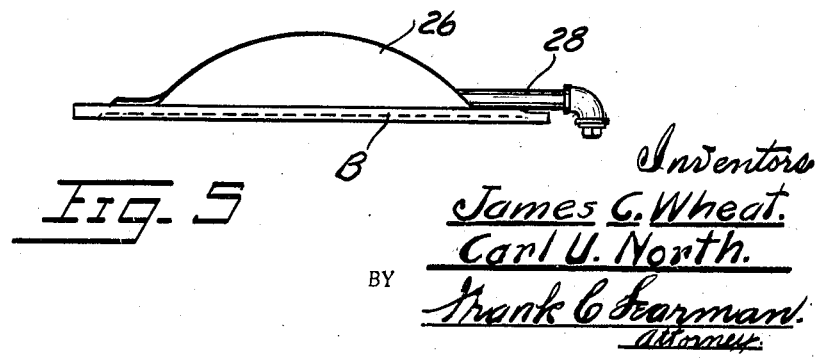
Fig. 5 is also an enlarged inverted side elevational view of the center cover.

The main car body casting of creeper tractors, cranes, shovels, and similar equipment is subjected to severe torsional strains due in part to the boom loads and pressure on the turntable rollers caused by digging operations, the weight of materials handled by the crane, the up-pull exerted by the center pin, and other operations incident to the operation of machines of this general classification. It is at present conventional practice by manufacturers in general to provide a very heavy casting with massive ribs and heavy wall sections to withstand said torsional strains and twists, and the bottom of the casting is open so that the mechanical equipment is exposed to dust, dirt, etc., this dust and dirt packing in the casting and sifting into and grinding out bearings, gears, and other moving parts, making for rapid wear, sloppy operation, frequent repair, and considerable breakage. It also reduced the life of the equipment and necessitated frequent repairs and replacements. Castings of this size and weight are expensive to produce and machine; and we have, therefore, designed an improved lightweight car body frame casting which can be readily handled and machined, and in which the open end is closed to exclude dust and dirt, the closures also serving as compression struts to resist the torsional strains resulting from the off-center load imposed by the turntable rollers and the up-pull exerted by the center pin or shaft.

Referring now more particularly to the drawings in which we have shown the preferred embodiment of our invention, the numeral 8 indicates the main car body casting comprising top, side, and end walls 9, 10, and 11, respectively; the top being circular in shape and with the side and end walls forming a box-like structure open at the bottom to facilitate the installation of the mechanical equipment which is mounted therein. Laterally projecting beam sections 12 form extensions of the end walls of the car body casting on the opposite sides thereof, and are adapted to be supported on and attached to the usual crawlers L on which the revolvable platform M is mounted. A centrally disposed hub 13 is formed integral with the member 8, and a vetically disposed hollow drive shaft 14 is journaled therein. Spaced apart, horizontally disposed ribs 15 are formed integral with and span the end walls of the casting, and transversely disposed ribs 16 serve to connect the ribs 15 and divide the car body casting into a plurality of compartments.

A horizontally disposed travel shaft 17 is journaled in bearings 7 provided in the lower end of the car body casting, and the crawler driving mechanism is mounted thereon; and we do not deem it necessary to show and describe this in detail as it forms the subject matter of a separate application filed by Franklin E. Terrill, Serial No. 404,689.

Angularly-shaped shear plates or blocks 18 are welded or otherwise secured to the lower face of the car body at the corners thereof, and cover plates A, B, and C, respectively, form a closure for the open end of said body.

The plates A and B are identically similar in construction, each plate having a centrally disposed sump 19 to accommodate the brake wheel F of the drive mechanism, and a manhole opening 20 is provided in the plate A to permit ready access to the mechanical equipment for adjustment or minor repair without necessitating removal of the entire cover plate, said opening being closed by a cover 21 as usual. The outer corners of the cover plates A and B are formed with block contacting portions or sections 22, the outer edges of which are slightly tapered to provide a tight wedge fit with the contacting face of the shear blocks 18. Similar sections 23 are provided on the opposite edge of the plates A and B at points spaced from the ends thereof, and diagonally disposed ribs 24 are provided in each plate to reinforce said cover at the point of greatest stress, the stud bolts 25 serving to secure the cover in position.

The center cover plate C is somewhat smaller than the side cover plates A and B, and is formed with a sump 26 to accommodate the main bevel gear 27 of the driving mechanism; and an oil line 28 is connected to the sump for supplying lubricant to said gear.

The corners of the plate B are formed with angularly-shaped projections 29 to snugly fit the sections 23 on the side plates A and B, the marginal rim of this center cover being heavier in cross section to further reinforce, and stud bolts 30 are provided to secure the plate in position; and it will be noted that the adjacent marginal edges of the cover plates are spaced apart, with the exception of the contacting projecting sections, and for a purpose to be presently described.

The torsional twists and strains imposed on the car body by the pressure of the rollers of the heavily loaded turntable, together with the upward pull or strain exerted through the center pin or drive shaft tends to distort the car body casting, and these tightly fitted sections of the cover members engaging the shear blocks serve as diagonal compression struts to resist distortion and reinforce and hold the open end of the body in proper true shape and alignment, preventing cracking or breakage of the casting, and maintaining true alignment of the mechanical equipment and working parts.

From the foregoing description it will be obvious that we have perfected a very simple, substantial, lightweight car body casting and covers for excavating machines and the like, which can be readily handled and machined, which are possessed of maximum strength, and which eliminates dust and dirt from the driving mechanism of the machine.

What we claim is:

1. In a crane of the creeper tractor type comprising a creeper supported main frame having top, side, and end walls, and an open bottom; longitudinally disposed ribs spanning the end walls and forming compartments; shear blocks provided on the corners of the lower open end of the frame; covers forming a closure for said open end compartments, and provided with projecting sections the contacting edge of which forms a wedge fit with said shear blocks and with each other; and diagonally disposed reinforcing ribs on certain of said cover plates forming compression struts for reinforcing and holding the open end of the main body in true shape and alignment.

2. In a machine of the class described comprising a creeper supported main frame formed with top, side, and end walls and an open bottom; shear blocks provided on the corners of the frame adjacent the open bottom, and formed with an angularly disposed contact edge; cover plates forming a closure for the open bottom and provided with angularly disposed projecting sections engageable with the angularly disposed edge of said shear blocks and with each other in tight interfitting engagement; diagonally disposed reinforced sections in said plates in alignment with said shear blocks and projecting sections, said cover plates forming compression struts for the open bottom of the main frame.

3. In a machine of the class described comprising a creeper supported main frame formed with top, side, and end walls and an open bottom; longitudinally and transversely disposed ribs reinforcing said frame and forming a plurality of open compartments; shear blocks mounted on the corners of the main frame adjacent the open bottom thereof; a plurality of spaced cover members forming a closure for certain of said compartments, each cover member being formed with angularly arranged projecting sections engageable with said shear blocks and with each other; diagonally disposed reinforced sections in certain of said plates in alignment with said shear blocks and projecting sections; and means for securing said cover members to the frame.

4. In a crane of the creeper tractor type comprising a main frame having top, side, and end walls, and an open bottom, shear blocks provided on the lower edge of the open end of the frame and formed with angularly disposed contact edges, and a cover plate forming a closure for the open bottom and provided with angularly disposed contact edges engageable with the contact edges of the shear blocks for resisting torsional strains and holding the open end of the main frame in true shape and alignment.

5. In a crane of the creeper tractor type comprising a creeper supported main frame having top, side, and end walls, and an open bottom, shear blocks provided on the corners of the lower open end of the frame, a cover forming a closure for the open end and provided with contacting edges forming a wedge fit with said shear blocks, said cover reinforcing and holding the open end of the main frame in true shape and alignment.

6. In a machine of the class described comprising a creeper supported main frame formed with top, side, and end walls, and an open bottom, shear block rigidly secured on the corners of the frame adjacent the open bottom, each block being formed with an angularly disposed contact edge, a cover plate forming a closure for the open bottom and also provided with angularly disposed contact edge surfaces engageable with the angularly disposed contact edges of the shear blocks in tight interfitting engagement, and means for securing said cover member to said frame.

JAMES C. WHEAT.
CARL U. NORTH.